(12) United States Patent
Kim et al.

(10) Patent No.: US 10,270,370 B2
(45) Date of Patent: Apr. 23, 2019

(54) ENERGY CONVERSION SUBSTRATE USING LIQUID

(71) Applicants: Korea Electronics Technology Institute, Seongnam-si, Gyeonggi-do (KR); SEOUL NATIONAL UNIVERSITY R&DB FOUNDATION, Seoul (KR)

(72) Inventors: Won Keun Kim, Seongnam-si (KR); Soon Hyung Kwon, Seoul (KR); Youn Sang Kim, Suwon-si (KR); Jun Woo Park, Yongin-si (KR)

(73) Assignees: KOREA ELECTRONICS TECHNOLOGY INSTITUTE, Seongnam-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 801 days.

(21) Appl. No.: 14/395,983

(22) PCT Filed: Dec. 18, 2013

(86) PCT No.: PCT/KR2013/011837
§ 371 (c)(1),
(2) Date: Oct. 21, 2014

(87) PCT Pub. No.: WO2014/098485
PCT Pub. Date: Jun. 26, 2014

(65) Prior Publication Data
US 2015/0123513 A1    May 7, 2015

(30) Foreign Application Priority Data
Dec. 21, 2012  (KR) .......................... 10-2012-0150552

(51) Int. Cl.
*H02N 1/00* (2006.01)
*H02N 1/08* (2006.01)

(52) U.S. Cl.
CPC .................................... *H02N 1/08* (2013.01)

(58) Field of Classification Search
CPC ......... H02N 99/00; H02N 11/002; H02N 1/08
(Continued)

(56) References Cited

U.S. PATENT DOCUMENTS 1,905,627 A * 4/1933 Holland .................... C25B 9/06
                                                    123/536
1,980,873 A * 11/1934 Niederreither ............ C25B 9/08
                                                    204/230.5
(Continued)

FOREIGN PATENT DOCUMENTS

JP      54-73592 A      6/1979
JP      2002-168876 A   6/2002
(Continued)

OTHER PUBLICATIONS

International Searching Authority, International Search Report for PCT/KR2013/011837 dated Feb. 4, 2014.
(Continued)

*Primary Examiner* — Julio C. Gonzalez
(74) *Attorney, Agent, or Firm* — Sughrue Mion, PLLC

(57) ABSTRACT

The present invention relates to an energy conversion substrate using a liquid and, more specifically, to an energy conversion substrate using a liquid capable of converting mechanical energy into electric energy through a flow of a liquid on a substrate having an energy conversion layer. Thus, the present invention enables easy manufacture and easy liquid circulation to be obtained by implementing an energy conversion device using a liquid through one substrate instead of a pair of opposing substrates and can (Continued)

implement the energy conversion device without a lubricating layer.

15 Claims, 4 Drawing Sheets

(58) Field of Classification Search
USPC .................. 310/300, 309, 36, 339; 290/1 R
See application file for complete search history.

(56) References Cited

U.S. PATENT DOCUMENTS

| | | | | |
|---|---|---|---|---|
| 4,126,822 | A * | 11/1978 | Wahlstrom | G04C 10/00 |
| | | | | 310/309 |
| 7,166,927 | B2 * | 1/2007 | Koslover | H02K 44/085 |
| | | | | 290/1 R |
| 7,898,096 | B1 | 3/2011 | Krupenkin | |
| 8,053,914 | B1 * | 11/2011 | Krupenkin | H02N 1/08 |
| | | | | 290/1 R |
| 9,024,462 | B2 * | 5/2015 | Thramann | H02N 11/008 |
| | | | | 280/602 |
| 9,203,291 | B2 * | 12/2015 | Krupenkin | H02K 44/00 |
| 2003/0178913 | A1 * | 9/2003 | Norimatsu | G02B 6/266 |
| | | | | 310/309 |
| 2006/0077762 | A1 * | 4/2006 | Boland | H02N 1/08 |
| | | | | 367/170 |
| 2010/0295415 | A1 * | 11/2010 | Despesse | H02N 1/08 |
| | | | | 310/300 |
| 2012/0169179 | A1 * | 7/2012 | Masaki | H02N 1/08 |
| | | | | 310/300 |
| 2014/0145554 | A1 * | 5/2014 | Takeuchi | H02N 1/08 |
| | | | | 310/309 |
| 2015/0295516 | A1 * | 10/2015 | Kwon | H02N 1/08 |
| | | | | 310/300 |
| 2015/0381077 | A1 * | 12/2015 | Park | H02N 1/00 |
| | | | | 310/309 |

FOREIGN PATENT DOCUMENTS

| | | |
|---|---|---|
| JP | 2005185090 A | 7/2005 |
| JP | 2006-022663 A | 1/2006 |
| JP | 2008-70323 A | 3/2008 |
| JP | 4880944 B2 | 2/2012 |
| KR | 10-2011-0089322 A | 8/2011 |

OTHER PUBLICATIONS

European Patent Office; Communication dated Dec. 11, 2015 in counterpart application No. 13865558.4.

Yang et al., "Power generation from conductive droplet sliding on electret film," Applied Physics Letters 100, 213905 (2012) 4 pages total.

Krupenkin et al., "Reverse electrowetting as a new approach to high-power energy harvesting," Nature Communications, Aug. 23, 2011, DOI: 10.1038/ncomms1454, 8 pages total.

Communication dated May 9, 2018, from the European Patent Office in counterpart European Application No. 13865558.4.

* cited by examiner

ENERGY CONVERSION SUBSTRATE USING LIQUID

CROSS REFERENCE TO RELATED APPLICATIONS

This application is a National Stage of International Application No. PCT/KR2013/011837 filed Dec. 18, 2013, claiming priority based on Korean Patent Application No. 10-2012-0150552 filed Dec. 21, 2012, the contents of all of which are incorporated herein by reference in their entirety.

TECHNICAL FIELD

The present invention relates to an energy conversion substrate using a liquid and, more specifically, to an energy conversion substrate using a liquid capable of converting mechanical energy into electric energy through a flow of a liquid on a substrate having an energy conversion layer.

BACKGROUND ART

The energy conversion technologies for converting mechanical energy into electrical energy of prior art use a principle that an electrical capacitance is being created in the electrode under a dielectric material by varying the contact area of a liquid metal which is being contact with a dielectric material in accordance with the flow of time.

A method and a device for converting energy using a fluid of prior art is being disclosed in the U.S. Pat. No. 7,898,096.

FIGS. 1(a) and 1(b) are a block diagram of a device of prior art for converting energy using a fluid. According to FIGS. 1(a) and 1(b), in a device of prior art for converting energy using a fluid, an electrode is formed to have a consistent pattern on the wall of a thin and long channel, and a dielectric material layer is formed above the electrode. Then, a little waterdrop-like conductive liquid and a non-conductive liquid are being injected into the channel, and by applying a voltage from an external power source to such a waterdrop-like conductive liquid, the conductive liquid is being depolarized.

At this state, when a physical pressure is applied to a predetermined portion (not shown) which is connected to the channel the depolarized waterdrop-like conductive liquid is moving along the channel, and during this process, the contact area of the multiple electrodes, which is formed with a consistent pattern, with the moving multiple conductive liquid droplet is continuously changing with time, and as a result, an electrical energy is generated due to the electrical capacitance change.

However, a method and a device of prior art for converting energy using a fluid have various problems for commercialization.

However, a method and a device of prior art for converting energy using a fluid should adopt a structure having two electrodes facing each other since it is based on Because of such a structural limitation, a method and a device of prior art for converting energy using a fluid, must use a narrow and thin channel structure, thus it has difficulty in manufacturing and difficulty in circulation of the liquid.

First, since a reversible movement, wherein a drop-like liquid metal, which has been moved inside the narrow and thin channel, is returning back to its original position when the external force is removed, is difficult, there is a limitation in that a separate lubricating layer is required and an inoperable condition happens due to the easy occurrence of the channel blocking phenomenon.

Moreover, since a method and a device of prior art for converting energy using a fluid adopt a narrow and thin channel structure, the two facing electrodes must be patterned with a fixed shape on the channel wall, and the device configuration becomes complicated due to such a structure, and the size of the module producing electrical energy becomes large, and there are many limitations in mass production or cost reduction.

In addition, as for other problems, it is harmful to the human body and the environment by using a liquid metal such as mercury or galinstan, and there is a limitation in that application of an external separate power source is required for depolarizing such a conductive liquid.

Further, a method and a device of prior art for converting energy using a fluid has problems in that the reversible movements in the channel structure must be continuously implemented, and the control is difficult since the two different kinds of immiscible liquids must be used.

SUMMARY OF INVENTION

Technical Problem

An objective of the present invention is to provide an energy conversion substrate using a fluid which induces, through the flow of a liquid droplet, a change in at least more than one of the contact surface, the contact area, or the contact angle between the energy conversion layer and the liquid, and converts this into the electrical energy.

Solution to Problem

To achieve above described objective, an energy conversion substrate using a liquid is provided which is characterized in that and includes: a first electrode and a second electrode patterned maintaining a space therebetween; and an energy conversion layer which is formed on at least one of said first electrode or said second electrode, wherein electrical energy is generated by said energy conversion layer due to the change in any one of a contact angle, a contact surface, and a contact area between the electrodes and the ionic liquid or water flowing over said electrodes.

Preferably, it is being characterized in that said energy conversion layer includes at least any one of an inorganic material layer, an organic material layer or a layer of mixture of organic and inorganic materials.

Preferably, it is being characterized in that a hydrophobic material layer is stacked on said energy conversion layer in order to facilitate the changes in contact surface, contact angle, or contact area with said ionic liquid or water.

Preferably, it is being characterized in that said ionic liquid includes at least any one of NaCl, LiCl, NaNO$_3$, Na$_2$SiO$_3$, AlCl$_3$—NaCl, LiCl—KCl, H$_2$O, KCL, Na, NaOH H$_2$SO$_4$, CH$_3$COOH, HF, CuSO$_4$, ethylene glycol, propylene glycol or AgCl.

Furthermore, an energy conversion substrate using a liquid being characterized in that and including: a first electrode and a second electrode patterned on the substrate with an interval; and an energy conversion layer formed on at least any one of said first electrode and said second electrode, wherein electrical energy is generated by said energy conversion layer due to the changes in any one of contact angle, contact surface, and contact area with said electrodes while a conductive liquid flows over said electrodes, is provided.

Preferably, it is being characterized in that said energy conversion layer includes at least any one of an inorganic material layer, an organic material layer or a layer of mixture of organic and inorganic materials.

Preferably, it is being characterized in that a hydrophile material layer is stacked on said energy conversion layer in order to facilitate the changes in contact surface, contact angle, or contact area with said ionic liquid or water.

Preferably, it is being characterized in that said hydrophile material layer includes at least any one material of poly acrylic acid (PAA), acrylamides, maleic anhydride copolymers, methacrylate, ethacrylate, amine-functional polymers, amine-functional polymers, polystyrenesulfonate (PSS), vinyl acids, vinyl alcohols, or functional group of —NH, —CO—, amino group —NH2, hydroxyl group —OH or carboxyl group —COOH.

Preferably, it is being characterized in that the range of the specific resistivity of said conductive liquid is 1 μΩ/cm to 1000 μΩ/cm, and the dielectric constant K is under 5.

Preferably, it is being characterized in that said energy conversion layer includes an organic material layer including at least any one material of polymethyl methacrylate (PMMA), polyethylene (PE), polystyrene (PS), polyvinyl pyrrolidone (PVP), poly(4-vinylpenol) (PVP) or polyethersulfone (PES), poly(4-methoxyphenylacrylate; PMPA), poly (phenylacrylate) (PPA), poly(2,2,2-trifluoroethyl methacrylate) (PTFMA), cyanoethylpullulan (CYEPL), polyvinyl chloride (PVC), poly(parabanic acid resin) (PPA), poly(t-butylstyrene) (PTBS), polythienylenevinylene (PTV), poly-vinylacetate (PVA), poly(vinyl alcohol) (PVA), poly(methylstyrene) (PAMS), poly(vinyl alcohol)-co-poly(vinyl acetate)-co-poly(itaconic acid) (PVAIA), polyolefin, polyacrylate, parylene-C, polyimide, octadecyltrichlorosilane (OTS), poly(triarylamine) (PTTA), poly-3-hexylthiophene (P3HT), cross-linked poly-4-vinylphenol (cross-linked PVP), poly(perfluoroalkenylvinyl ether), nylon-6, n-octadecylphosphonic acid (ODPA), polytetrafluoroethylene (PTFE), silicone, polyurethane, latex, cellulose acetate, poly (hydroxy ethyl methacrylate) (PHEMA), polylactide (PLA), polyglycolide (PGA), or polyglycolide-co-lactide (PGLA).

Preferably, it is being characterized in that said energy conversion layer includes an inorganic material layer including at least any one material of $SiO_2$, $TiO_2$, $Al_2O_3$, $Ta_2O_5$, tantalum pentoxide, zinc oxide (ZnO), tantalum pentoxide ($Ta_2O_5$), yttrium oxide ($Y_2O_3$), cerium oxide ($CeO_2$), titanium dioxide ($TiO_2$), barium titanate ($BaTiO_3$), barium zirconate titanate (BZT), zirconium dioxide ($ZrO_2$), lanthanum oxide ($La_2O_3$), hafnon ($HfSiO_4$), lanthanum aluminate ($LaAlO_3$), silicon nitride ($Si_3N_4$), as perovskite materials, strontium titanate ($SrTiO_3$), barium strontium titanate (BST), lead zirconate titanate (PZT), calcium copper titanate (CCTO), or $HfO_2$, apatite ($A_{10}(MO_4)_6X_2$), hydroxyapatite ($Ca_{10}(PO_4)_6(OH)_2$), tricalcium phosphate ($Ca_3(PO_4)_2$), $Na_2O$—CaO—$SiO_2$, or bioglass (CaO—$SiO_2$—$P_2O_5$).

Preferably, it is being characterized in that said energy conversion layer has a structure formed therein for enlarging the contact area with the liquid.

Preferably, it is being characterized in that said first electrode or said second electrode is an inorganic electrode including at least any one of ITO, IGO, chrome, aluminum, indium zinc oxide (IZO), indium gallium zinc oxide (IGZO), ZnO, $ZnO_2$ or $TiO_2$; or a metal electrode including at least any one of platinum, gold, silver, aluminum, iron or copper; or an organic electrode including at least any one of poly-ethylenedioxythiophene (PEDOT), carbon nano tube (CNT), graphene, polyacetylene, polythiophene (PT), poly-pyrrole, polyparaphenylene (PPV), polyanilinep), poly sulfur nitride, stainless steel, iron alloy containing more than 10% of crome, SUS 304, SUS 316, SUS 316L, Co—Cr alloy, Ti alloy, nitinol (Ni—Ti) or polyparaphenylenevi-nylene.

Preferably, it is being characterized in that said first electrode is patterned to have a planar type concave area, and said second electrode is patterned to have a convex area corresponding said concave area.

Other detailed contents of the exemplary embodiments are included in the detailed description and the drawings.

Advantageous Effects of Invention

The present invention has an effect on achieving simple manufacturing and easy liquid circulation by implementing the energy conversion device using a fluid through a single substrate instead of a pair of opposing substrates.

In addition, the present invention has an effect on implementing an energy conversion device which simplifies the device, reduces manufacturing cost, and provides a device with low failure rate since a lubricating layer is not required.

In addition, the present invention is advantageous in that an efficient energy conversion is possible without applying a separate external power supply, And, the present invention has an effect on solving harmful problems to human body and the environments by using an ionic liquid or water.

DETAILED DESCRIPTION OF EMBODIMENT

The advantages and the features of the present invention, and the method for achieving thereof will become apparent with reference to the exemplary embodiments described in detail hereinafter with the accompanying drawings. However, the present invention will not be limited to the exemplary embodiments described hereinafter, but will be implemented in a various different forms, and the exemplary embodiments are provided for the completeness of the disclosure of the present invention and to teach an ordinary person of skill in the art of the scope of the invention completely, and the present invention is only be defined by the scope of the claims. Meanwhile, the terms used in the description are for describing the exemplary embodiments, but not to limit the present invention.

Figure 1A:
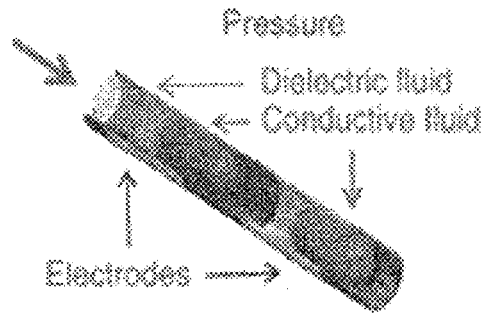
FIGS. 1(a) and 1(b) are a block diagram of a device for converting energy using a fluid of prior art.
Figure 1B:
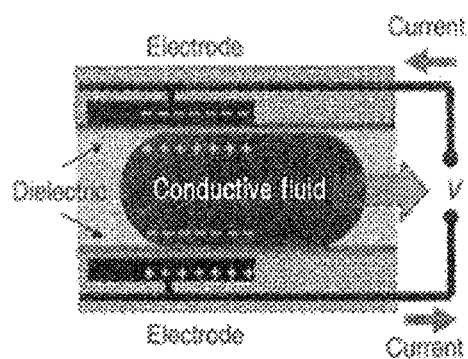
Figure 2A:
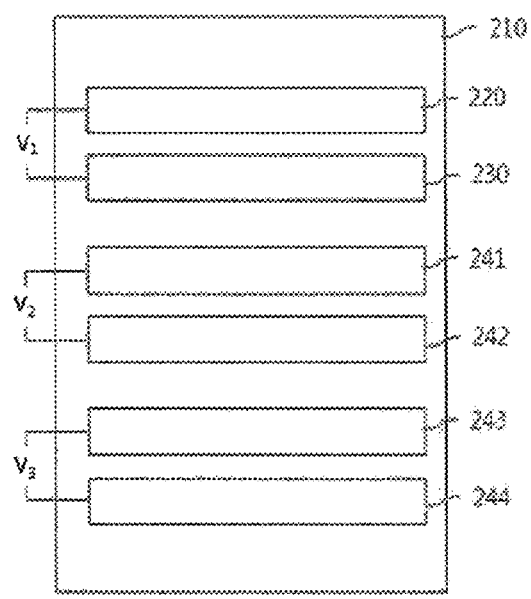
FIGS. 2(a) and 2(b) are a schematic diagram of an energy conversion substrate using a fluid according to an exemplary embodiment of the present invention.
Figure 2B:
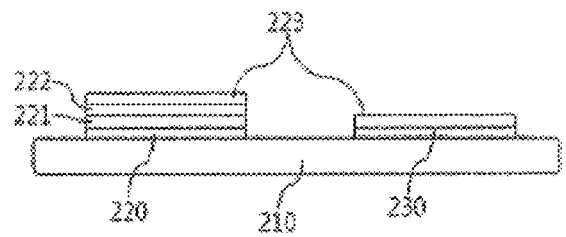

FIG. 2 is a schematic diagram of an energy conversion substrate using a fluid according to an exemplary embodiment of the present invention. According to FIG. 2, an energy conversion substrate using a fluid according to an exemplary embodiment of the present invention is configured to include: a base substrate 210; a first electrode 220 and a second electrode 230 patterned on said base substrate 210 with an interval; and an energy conversion layer 221, 222 formed on at least any one of said first electrode 220 and said second electrode 230.

The energy conversion layer 221, 222 generates electrical energy due to the changes in any one of contact angle, contact surface, and contact area with said electrodes while a conductive liquid flows over said electrodes.

Figure 6:
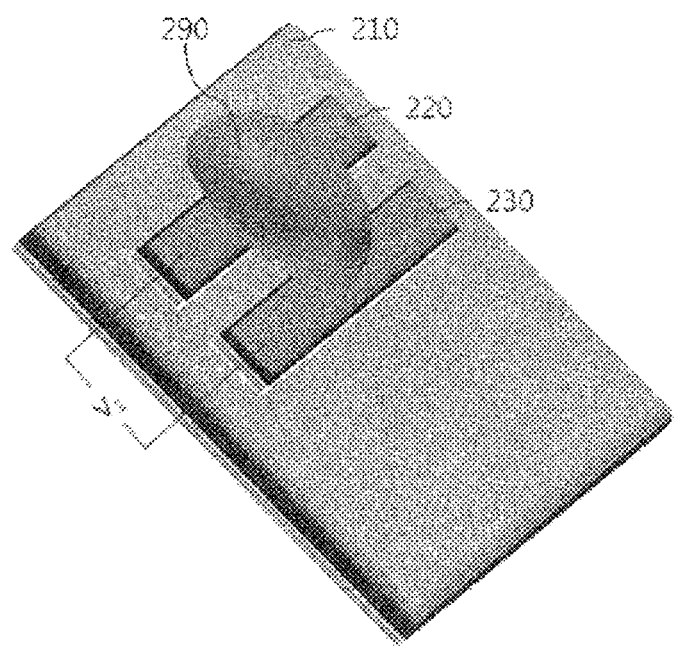
FIG. 6 is a drawing showing an aspect of using an energy conversion substrate using a fluid according to an exemplary embodiment of the present invention.

FIG. 6 is a drawing showing an aspect of using an energy conversion substrate using a fluid according to an exemplary embodiment of the present invention. According to FIG. 6, the ionic liquid or water 290 on the base substrate is being flowed due to the slanting of the base substrate 210, thereby changing the contact surface, the contact area or the contact angle with the first electrode 220 and the second electrode 230. By this flow, the energy conversion substrate converts the mechanical energy, which is the movement of the ionic liquid or water 290, into electrical energy.

In other words, an energy conversion substrate using a fluid according to an exemplary embodiment of the present invention generates electrical energy according to the change of at least any one of the contact surface, the contact angle or the contact area between the ionic liquid or water 290 and the first electrode 220 and the second electrode 230.

Again, according to FIG. 2, according to an exemplary embodiment of the present invention, an energy conversion layer is formed by stacking of an inorganic material layer 221 and/or an organic material layer 222. Preferably, a method such as patterning or vacuum deposition, or spin coating may be used for forming such an energy conversion layer.

In stacking the inorganic material layer 221 and the organic material layer 222 on the first electrode 210 or on the second electrode 220, the order of stacking will not matter, however, they must be stacked adjacently.

Further, preferably, the energy conversion layer may be formed as an integrated layer so as to cover all of the first electrode 210 and the second electrode 220.

Preferably, the inorganic material layer 221 and the organic material layer 222 may be alternately and repeatedly filed up when being stacked on the first electrode 210 or on the second electrode 220. In other words, an energy conversion layer can be formed by repeatedly stacking the inorganic material layer 221 and the organic material layer 222.

According to a preferred exemplary embodiment of the present invention, the inorganic material layer 221 or the organic material layer 222 is being vacuum deposited so as to form a structure for enlarging the contact area with said ionic liquid or water.

FIGS. 4a to 4d are side views showing an exemplary embodiment of an energy conversion layer of an energy conversion substrate using a fluid according to an exemplary embodiment of the present invention. According to FIGS. 4a to 4d, in an energy conversion layer of an energy conversion substrate using a fluid according to an exemplary embodiment of the present invention, an inorganic material layer 430 is vacuum deposited on the electrode 420 which is being patterned on the base substrate 410. The organic material layer 440 is stacked on the inorganic material layer 430 to form a micro structure having shapes such as a convex-concave shape shown in FIG. 4a, a sharply protruded shape shown in FIG. 4b, a semi sphere shape shown in FIG. 4c, and a spherical pit shape shown FIG. 4d. Preferably, the stacking order between the organic material layer 440 and the inorganic material layer 430 may be reversed, and the stacking material for forming the structure is not necessarily to be an organic material layer 440.

Preferably, a hydrophobic material layer 450 is stacked on the organic material layer 440 which is being stacked for forming said structure so that the shape of said structure is being maintained.

Such shapes of the structure have effects on increasing the generation efficiency of electrical energy by enlarging the change in the contact area between said electrode 420 and said ionic liquid or water.

According to a preferred exemplary embodiment of the present invention, a hydrophobic material layer 223 is stacked on the energy conversion layer 221, 222. Such a hydrophobic material layer 223 is stacked for the ionic liquid or water so as to facilitate the change in the contact surface, the contact angle, or the contact area with the electrodes 221, 222.

Preferably, the hydrophobic material layer 223 may be stacked on the first electrode 210 or the second electrode 220 where the energy conversion layer is not yet formed.

According to a preferred exemplary embodiment of the present invention, the energy conversion layer includes an organic material layer 222 including at least any one material of polymethylmethacrylate (PMMA), polyethylene (PE), polystyrene (PS), polyvinylpyrrolidone (PVP), poly (4-vinylpenol) (PVP) or polyethersulfone (PES), poly(4-methoxyphenylacrylate; PMPA), poly(phenylacrylate) (PPA), poly(2,2,2-trifluoroethyl methacrylate) (PTFMA), cyanoethylpullulan (CYEPL), polyvinyl chloride (PVC), poly(parabanic acid resin) (PPA), poly(t-butylstyrene) (PTBS), polythienylenevinylene (PTV), polyvinylacetate (PVA), poly(vinyl alcohol) (PVA), poly(methylstyrene) (PAMS), poly(vinyl alcohol)-co-poly(vinyl acetate)-co-poly (itaconic acid) (PVAIA), polyolefin, polyacrylate, parylene-C, polyimide, octadecyltrichlorosilane (OTS), poly(tri-arylamine) (PTTA), poly-3-hexylthiophene (P3HT), cross-linked poly-4-vinylphenol (cross-linked PVP), poly (perfluoroalkenylvinyl ether), nylon-6, n-octadecylphosphonic acid (ODPA), polytetrafluoroethylene (PTFE), silicone, polyurethane, latex, cellulose acetate, poly(hydroxy ethyl methacrylate) (PHEMA), polylactide (PLA), polyglycolide (PGA), or polyglycolide-co-lactide (PGLA); and an inorganic material layer 221 including at least any one material of $SiO_2$, $TiO_2$, $Al_2O_3$, $Ta_2O_5$, tantalum pentoxide, zinc oxide (ZnO), tantalum pentoxide ($Ta_2O_5$), yttrium oxide ($Y_2O_3$), cerium oxide ($CeO_2$), titanium dioxide ($TiO_2$), barium titanate ($BaTiO_3$), barium zirconate titanate (BZT), zirconium dioxide ($ZrO_2$), lanthanum oxide ($La_2O_3$), hafnon ($HfSiO_4$), lanthanum aluminate ($LaAlO_3$), silicon nitride ($Si_3N_4$), as perovskite materials, strontium titanate ($SrTiO_3$), barium strontium titanate (BST), lead zirconate titanate (PZT), calcium copper titanate (CCTO), or $HfO_2$, apatite ($A_{10}(MO_4)_6X_2$), hydroxyapatite ($Ca_{10}(PO_4)_6(OH)_2$), tri calcium phosphate ($Ca_3(PO_4)_2$), $Na_2O$—CaO—$SiO_2$, or bioglass (CaO—$SiO_2$—$P_2O_5$).

Preferably, a material having a dielectric constant K under 4 may be used as for an organic material 222, and a material having a dielectric constant K over 5 may be used as for an inorganic material 221.

According to an exemplary embodiment of the present invention, an hydrophobic material layer 250 comprises at least any one or a mixture of silane family material, fluoropolymer material, trichlorosilane, trimethoxysilane, pentafluorophenylpropyltrichlorosilane, (benzyloxy)alkyltrimethoxysilane (BSM-22), (benzyloxy)alkyltrichlorosilane (BTS), hexamethyldisilazane (HMDS), octadecyltrichlorosilane (OTS), octadecyltrimethoxysilane (OTMS), and divinyltetramethyldisiloxane-bis(benzocyclobutene) (BCB).

According to an exemplary embodiment of the present invention, the first electrode 210 or the second electrode 220 is an inorganic electrode which includes at least any one of ITO, IGO, chrome, aluminum, indium zinc oxide (IZO), indium gallium zinc oxide (IGZO), ZnO, $ZnO_2$ or $TiO_2$; or a metal electrode including at least any one of aluminum, iron or copper; or an organic electrode including at least any one of polyethylenedioxythiophene (PEDOT), carbon nano tube (CNT), graphene, polyacetylene, polythiophene (PT), polypyrrole, polyparaphenylene (PPV), polyanilinep), poly sulfur nitride or polyparaphenylenevinylene.

According to a preferred exemplary embodiment of the present invention, an ionic liquid 260 includes at least any one of NaCl, LiCl, $NaNO_3$, $Na_2SiO_3$, $AlCl_3$—NaCl, LiCl—KCl, $H_2O$, KCL, Na, NaOH $H_2SO_4$, $CH_3COOH$, HF, $CuSO_4$, ethylene glycol, propylene glycol or AgCl.

Preferably, an energy conversion substrate according to an exemplary embodiment of the present invention is operated in an environment filled with a non-conductive gas. Generally, above mentioned space is possible with a common air environment.

Preferably, the non-conductive gas includes at least any one of air, oxygen, nitrogen, argon, helium, neon, krypton, xenon, or radon.

Preferably, as illustrated in FIG. 2, it may be configured for generating the electrical energy V1 by the pair comprising the first electrode 220 and the second electrode 230, and additionally configured for generating the electrical energy V2 and V3 by the electrode pairs 241, 242, 243, and 244.

Figure 3:
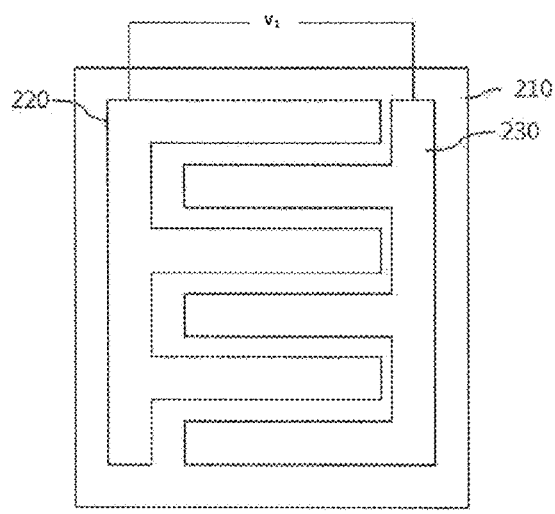
FIG. 3 is another schematic diagram of an energy conversion substrate using a fluid according to an exemplary embodiment of the present invention.
Figure 4A:
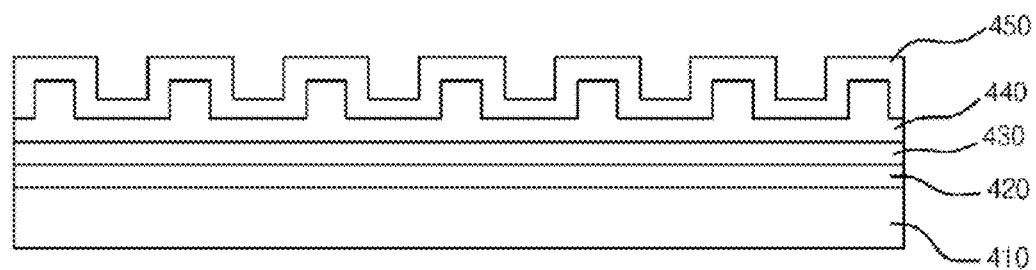
FIGS. 4(a) to 4(d) are side views showing the cross-sectional views of an energy conversion layer of an energy conversion substrate using a fluid according to an exemplary embodiment of the present invention.
Figure 4B:
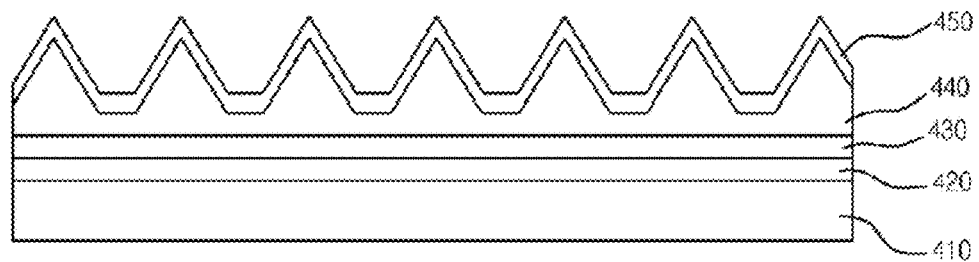
Figure 4C:
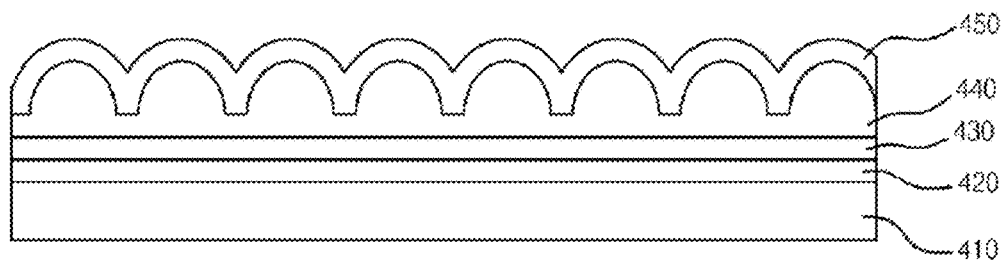
Figure 4D:
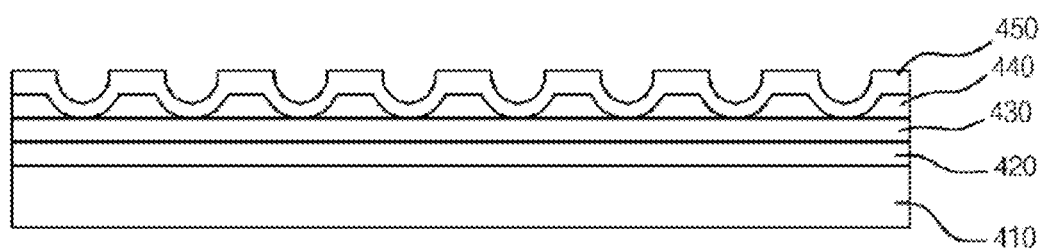

FIG. 3 is another schematic diagram of an energy conversion substrate using a fluid according to an exemplary embodiment of the present invention. According to FIG. 3, an energy conversion substrate using a fluid according to another exemplary embodiment of the present invention is configured such that the first electrode 220 is patterned on the base substrate 210 to have a planar type concave area, and the second electrode 220 is patterned to have a convex type area corresponding to said concave area.

Through this configuration, the conversion efficiency of energy can be increased by enlarging the changes in the contact surface, the contact area, the contact angle, and the like with the ionic liquid or water.

Figure 5A:
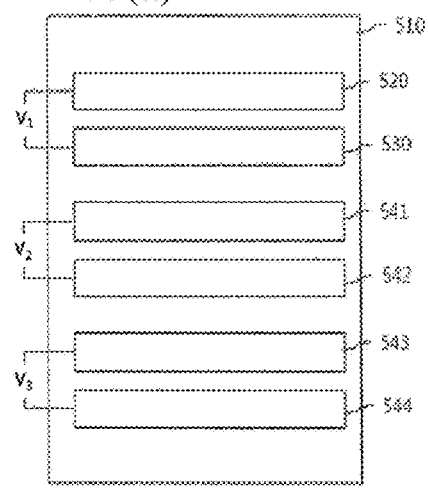
FIGS. 5(a) and 5(b) are a structural diagram of an energy conversion substrate using a fluid according to another exemplary embodiment of the present invention.
Figure 5B:
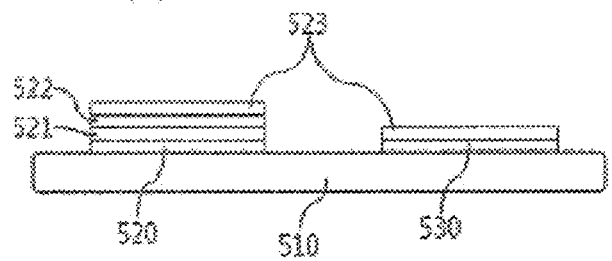

FIG. 5 is a structural diagram of an energy conversion substrate using a fluid according to another exemplary embodiment of the present invention. According to FIG. 5, an energy conversion substrate using a fluid according to another exemplary embodiment of the present invention is configured to include: a base substrate 510; a first electrode 520 and a second electrode 530 patterned on said base substrate 510 with an interval; and an energy conversion layer 521, 522 formed on at least any one of said first electrode 520 and said second electrode 530.

The energy conversion layer 521, 522 generates electrical energy due to the changes in any one of contact angle, contact surface, and contact area with said electrodes while a conductive liquid flows over said electrodes.

According to a preferred exemplary embodiment of the present invention, it is preferred that the conductive liquid may use mercury, lithium, gallium, kalium, NaK, bismuth, tin, natrium, natrium-kalium alloy, and the like; the range of the specific resistivity is 1 $\mu\Omega$/cm to 1000 $\mu\Omega$/cm, and the dielectric constant K is under 5.

According to a preferred exemplary embodiment of the present invention, a hydrophile material layer 523 is stacked on said energy conversion layer 521, 522. Such a hydrophile material layer 523 is stacked so as to facilitate the changes in contact surface, contact angle, or contact area between the conductive liquid and the electrodes 520 and 530.

According to a preferred exemplary embodiment of the present invention, a hydrophile material layer 523, a hydrophile material layer 523 includes at least any one material of poly acrylic acid (PAA), acrylamides, maleic anhydride copolymers, methacrylate, ethacrylate, amine-functional polymers, amine-functional polymers, polystyrenesulfonate (PSS), vinyl acids, vinyl alcohols, or functional group of —NH, —CO—, amino group —$NH_2$, hydroxyl group —OH or carboxyl group —COOH.

Besides, in the above described exemplary embodiment using a conductive liquid, the detailed descriptions of the technical contents related to features, structures, the patterned shape of the electrode, and the like of the first electrode 520, the second electrode 530, the inorganic material layer 521, and the organic material layer 522, are omitted since it can be configured according to the foregoing exemplary embodiments using the ionic liquid or water, or the contents described in FIG. 2 or FIG. 3.

As reviewed before, when compared with prior art using more than two different kinds of liquids, the present invention may prevent blocking and mixing phenomena inside the channel, and also it does not require any lubricating layer. Especially, since it does not require a pair of facing electrodes, there is not a difficulty in manufacturing of channel structure and the like, or a structural limitation which makes liquid circulation difficult, thus, an energy conversion device which is more economical and facilitating management.

Furthermore, although the technologies of prior art suggests an insulation layer comprising a single self assembly molecular monolayer and a single dielectric layer, or more layers of non-conductive layers, or the various combination thereof, however, the present invention suggests a structure for optimizing the energy conversion efficiency. In other words, it is configured to have (according to the stacking order) a structure of electrode/inorganic material layer/organic material layer/(select a layer from a hydrophobic material layer or a hydrophile material layer according to the type of liquid), or a structure of electrode/organic material layer/inorganic material layer/(select a layer from a hydrophobic material layer or a hydrophile material layer according to the type of liquid) on at least one side of the substrate of the first electrode or the second electrode; while it may be modified to be configured to have (according to the stacking order) a structure of electrode/inorganic material layer/organic material layer/(select a layer from a hydrophobic material layer or a hydrophile material layer according to the type of liquid), or a structure of electrode/organic material layer/inorganic material layer/(select a layer from a hydrophobic material layer or a hydrophile material layer according to the type of liquid) on both of the first electrode and the second electrode.

And, application of an external power source for depolarization is required in using a conductive liquid according to the technology of prior art, however, application of an external power source is not required in the present invention since the energy conversion layer performs depolarizing function for the ionic liquid.

Although the preferred exemplary embodiments and the application examples are illustrated and described, heretofore, the present invention is not limited by the above described specific exemplary embodiments and the application examples, naturally, various variant embodiments are possible by a person of ordinary skill in the art without

| Description of Symbols | |
|---|---|
| 210: base substrate, | 220: first electrode |
| 230: second electrode, | 221: inorganic material layer |
| 222: organic material layer, | 223: hydrophobic material layer |
| 290: ionic liquid or water | |

What is claimed is:

1. An energy conversion substrate using a fluid, the energy conversion substrate comprising: a first electrode disposed on a base substrate and a second electrode disposed on the same base substrate; and an energy conversion layer which is formed on at least one of said first electrode and said second electrode, wherein electrical energy is generated between the first electrode and the second electrode, without using an electrode facing the first electrode and the second electrode in a direction that is vertical to the base substrate, by said energy conversion layer by using a change in at least one of a contact angle, a contact surface, and a contact area of a contact between the first and second electrodes and an ionic liquid or water flowing over the first and second electrodes, and the electrical energy is generated based on the ionic liquid flowing over the first electrode and the second electrode, and the first electrode and the second electrode directly contact with the ionic liquid.

2. The energy conversion substrate using a fluid in claim 1, wherein
said energy conversion layer includes at least any one of an inorganic material layer, an organic material layer or a layer of mixture of organic and inorganic materials.

3. The energy conversion substrate using a fluid in claim 2,
wherein
a hydrophobic material layer is stacked on said energy conversion layer in order to facilitate the change in the at least one of the contact surface, the contact angle, and the contact area with said ionic liquid or water.

4. The energy conversion substrate using a fluid in claim 1,
wherein
said ionic liquid includes at least any one of NaCl, LiCl, $NaNO_3$, $Na_2SiO_3$, $AlCl_3$—NaCl, LiCl—KCl, $H_2O$, KCL, Na, NaOH $H_2SO_4$, $CH_3COOH$, HF, $CuSO_4$, ethylene glycol, propylene glycol or AgCl.

5. The energy conversion substrate using a fluid in claim 1,
wherein
said energy conversion layer includes an organic material layer including at least any one material of polymethylmethacrylate (PMMA), polyethylene(PE), polystyrene (PS), polyvinylpyrrolidone (PVP), poly(4-vinylpenol)(PVP) or polyethersulfone (PES), poly(4-methoxyphenyl acrylate; PMPA), poly(phenylacrylate) (PPA), poly(2,2,2-trifluoroethyl methacrylate) (PTFMA), cyanoethylpullulan (CYEPL), polyvinyl chloride (PVC), poly(parabanic acid resin)(PPA), poly(t-butylstyrene)(PTBS), polythienylenevinylene(PTV), polyvinylacetate (PVA), poly(vinyl alcohol)(PVA), poly(rmethylstyrene)(PAMS), poly(vinyl alcohol)-co-poly(vinyl acetate)-co-poly(itaconic acid)(PVAIA), polyolefin, polyacrylate, parylene-C, polyimide, octadecyltrichlorosilane(OTS), poly(triarylamine)(PTTA), poly-3-hexylthiophene (P3HT), cross-linked poly-4-vinylphenol (cross-linked PVP), poly(perfluoroalkenylvinyl ether), nylon-6, n-octadecylphosphonic acid (ODPA), polytetrafluoroethylene(PTFE), silicone, polyurethane, latex, cellulose acetate, poly(hydroxy ethyl methacrylate)(PHEMA), polylactide (PLA), polyglycolide (PGA), or polyglycolide-co-lactide (PGLA).

6. The energy conversion substrate using a fluid in claim 1,
wherein
said energy conversion layer includes an inorganic material layer including at least any one material of $SiO_2$, $TiO_2$, $Al_2O_3$, $Ta_2O_5$, tantalum pentoxide, zinc oxide (ZnO), tantalum pentoxide ($Ta_2O_5$), yttrium oxide ($Y_2O_3$), cerium oxide ($CeO_2$), titanium dioxide ($TiO_2$), barium titanate ($BaTiO_3$), barium zirconate titanate (BZT), zirconium dioxide ($ZrO_2$), lanthanum oxide ($La_2O_3$), hafnon ($HfSiO_4$), lanthanum aluminate ($LaAlO_3$), silicon nitride ($Si_3N_4$), as perovskite materials, strontium titanate ($SrTiO_3$), barium strontium titanate (BST), lead zirconate titanate (PZT), calcium copper titanate (CCTO), or $HfO_2$, apatite ($A_{10}(MO_4)_6X_2$), hydroxyapatite ($Ca_{10}(PO_4)_6(OH)_2$), tricalcium phosphate ($Ca_3(PO_4)_2$), $Na_2O$—CaO—$SiO_2$, or bioglass (CaO—$SiO_2$—$P_2O_5$).

7. The energy conversion substrate using a fluid in claim 1,
wherein
said energy conversion layer has a structure formed therein for enlarging the contact area with the ionic liquid.

8. The energy conversion substrate using a fluid in claim 1,
wherein
said first electrode or said second electrode is an inorganic electrode including at least any one of ITO, IGO, chrome, aluminum, indium zinc oxide (IZO), indium gallium zinc oxide (IGZO), ZnO, $ZnO_2$ or $TiO_2$; or a metal electrode including at least any one of platinum, gold, silver, aluminum, iron or copper; or an organic electrode including at least any one of polyethylenedioxythiophene (PEDOT), carbon nano tube (CNT), graphene, polyacetylene, polythiophene (PT), polypyrrole, polyparaphenylene(PPV), polyanilinep), poly sulfur nitride, stainless steel, iron alloy containing more than 10% of crome, SUS 304, SUS 316, SUS 316L, Co—Cr alloy, Ti alloy, nitinol (Ni—Ti) or polyparaphenylenevinylene.

9. The energy conversion substrate using a fluid in claim 1,
wherein
said first electrode is patterned to have a planar type concave area, and said second electrode is patterned to have a convex area corresponding said planar type concave area.

10. The energy conversion substrate using a fluid in claim 1, wherein the electrical energy is generated based on the water flowing over the first electrode and the second electrode, and the first electrode and the second electrode directly contact with the water.

11. An energy conversion substrate using a fluid, the energy conversion substrate comprising: a first electrode disposed on a base substrate and a second electrode disposed on the same base substrate; and an energy conversion layer formed on at least any one of said first electrode and said second electrode, wherein electrical energy is generated between the first electrode and the second electrode, without using an electrode facing the first electrode and the second electrode in a direction that is vertical to the base substrate, by said energy conversion layer by using a change in at least one of a contact angle, a contact surface, and a contact area of a contact between the first and second electrodes and a conductive liquid flowing over the first and second electrodes, and the electrical energy is generated based on an ionic liquid flowing over the first electrode and the second electrode, and the first electrode and the second electrode directly contact with the ionic liquid.

12. The energy conversion substrate using a fluid in claim 11,
wherein
said energy conversion layer includes at least any one of an inorganic material layer, an organic material layer or a layer of mixture of organic and inorganic materials.

13. The energy conversion substrate using a fluid in claim 12,
wherein
a hydrophile material layer is stacked on said energy conversion layer in order to facilitate the change in the at least one of the contact surface, the contact angle, and/or the contact area with the conductive liquid.

14. The energy conversion substrate using a fluid in claim 13,
wherein
said hydrophile material layer includes at least any one material of poly acrylic acid (PAA), acrylamides, maleic anhydride copolymers, methacrylate, ethacrylate, amine-functional polymers, amine-functional polymers, polystyrenesulfonate (PSS), vinyl acids, vinyl alcohols, or functional group of —NH, —CO—, amino group —NH2, hydroxyl group —OH or carboxyl group —COOH.

15. The energy conversion substrate using a fluid in claim 11, wherein a range of a specific resistivity of said conductive liquid is $1\mu\Omega/cm$ to $1000\mu\Omega/cm$, and a dielectric constant K of said conductive liquid is under 5.

* * * * *